United States Patent Office 2,977,356
Patented Mar. 28, 1961

2,977,356

PROCESS FOR PREPARING CROSS-LINKED STARCH ETHERS IN GRANULE FORM

John D. Commerford, St. Louis County, and Irving Ehrenthal, University City, Mo., assignors to Anheuser-Busch, Incorporated, St. Louis, Mo., a corporation of Missouri No Drawing. Filed May 27, 1958, Ser. No. 738,050

4 Claims. (Cl. 260—233.3)

The present invention relates generally to the preparation of cross linked polysaccharide ethers and more specifically to the reaction of diepoxides with various starches in their original unswollen granular form.

In the past monofunctional epoxides have been used to produce starch ethers. In all instances these reactions were carried out in the presence of alkaline catalysts or materials capable of producing an alkaline condition in the reaction mixture. Extreme care had to be observed to prevent the gelatinization of the starch under these alkaline conditions. Loss of reagent was encountered due to the polymerization of the epoxide in the presence of an alkaline catalyst. Most of the monofunctional epoxides used had undesirable physical properties such as high volatility and explosiveness necessitating extreme caution in their handling and expensive equipment in their use.

We have discovered a method of preparing cross linked starch ethers in their original granule state which eliminates many of the difficulties usually encountered in the past in preparing simple ethers. In addition, these new products have certain desirable properties among which are a higher viscosity and a reduced tendency to retrograde.

It is an object of the present invention therefore to produce cross linked starch ethers with reduced retrograding tendencies after cooking. It is a further object to produce a starch derivative having a high paste viscosity which is maintained at a substantially constant level during prolonged cooking. It is a further object of the present invention to react starches with diepoxides to produce a starch derivative having a high viscosity and with greatly reduced retrograding and gelling tendencies.

It is a further object to provide a method of reacting carbohydrates with diepoxides to form modified products having the desired characteristics of decreased gelling tendencies, high viscosity and viscosity stability.

A further object is to provide a simplified process for the production of starch ethers by the reaction of diepoxides directly with starch suspensions as produced in the wet milling industry, that is, under acid conditions and in open tanks, thus simplifying the production process and rendering it more economical.

These and other objects and advantages will become apparent hereinafter.

Briefly, the present invention comprises reacting a specified quantity of a diepoxide with starch under specified conditions of time, pH, and temperature to produce a starch derivative with reduced retrograding tendencies and high viscosity stability. The invention further consists in the process hereinafter described and claimed, and in the starch derivative made by said process. A detailed description of the present invention follows.

A starch slurry is provided, such as unmodified corn starch granules and water, having from about 40% to about 50% by weight unmodified corn starch granules at a temperature of about 120° F. The starting pH of the starch slurry will usually vary from about 3 to about 5 depending upon the source of the corn, the time of the year and conditions in the plant which produces the slurry. If desired, a base or acid may be added to adjust the pH of the starch slurry to preferably between about 3.0 to about 11.0. Any base or acid may be used to adjust the pH to a suitable level. Bases such as sodium hydroxide, sodium carbonate or the like are suitable and both mineral acids such as hydrochloric acid and organic acids such as formic acid may be used. The acid or base acts as a catalyst and increases the rate of reaction of the diepoxide with the starch. If the pH is too high, the starch will gelatinize and clog or damage the starch plant equipment. If the pH is too low, the strong acids have a tendency to hydrolyze the starch. The density of the starch slurry is not unduly critical.

A selected quantity of the diepoxide is added to the starch slurry, preferably from about 0.01 mole to about 0.15 mole per mole of anhydro glucose unit of the starch. The suspension is agitated continuously for about 18 hours at a temperature of about 115° F. The slurry is then filtered and the resulting product is washed and dried. When this dry starch product is reslurried in water and cooked, it will give a paste of altered viscosity and reduced gelling tendency.

Thus, by treating an unmodified corn starch slurry with a diepoxide under specified conditions, products having numerous industrial uses are produced. For commercial purposes, it is desirable to use corn starches because they are plentiful and inexpensive. In industry, one of the disadvantages of using unmodified corn starches is their tendency to retrograde. In textile sizing and paper coating, a product which has decreased retrograding tendencies and which maintains a stable viscosity is desired. These modified starches can also be used as a filler or viscosity increasing agent in food products such as pie fillings, canned corn, etc. In the adhesive industry a product having a stable paste viscosity is needed. It is seen that diepoxide treated starches having these properties of reduced gelling tendency, high viscosity, and viscosity stability are desirable for the above mentioned industrial uses.

Since the viscosity of different batches of unmodified starch, when cooked, is not uniform (primarily due to variations in the characteristics of the corn from which it was produced and the conditions of manufacture), we used a "control" starch having a viscosity of 150 gram centimeters when cooked at 5% solids in comparing the various modified starches. All viscosities were measured with a Corn Industries Research Foundation Viscometer.

The following examples illustrate our process:

*Example 1*

0.3 ml. (milliliters) of 90% formic acid and 7.5 g. (grams) of limonene dioxide were added to a 44.5% by weight unmodified corn starch slurry containing 206 g. of starch. The pH of the slurry was 3.1. The suspension was agitated continuously for 18 hours at 48–50° C. The slurry was then adjusted to pH 5.0, filtered, washed and dried. The starch product when cooked in a Corn Industries Viscometer at 5% solids gave a maximum viscosity of 250 g.-cm. as compared with 150 g.-cm. for unmodified starch. The viscosity after 30 minutes of cooking was 240 g.-cm. for the treated sample as compared with 135 g.-cm. for unmodified starch. The cooled paste formed a much softer gel than did the paste from unmodified corn starch.

*Example 2*

Example 1 was repeated except that the time of reaction of starch and limonene dioxide was 7 hours. The maximum viscosity of a 5% solids cook of the resulting product was 240 g.-cm. while after 30 minutes the viscosity was 205 g.-cm.

*Example 3*

5.1 g. of limonene dioxide was added to a 49.7% by weight unmodified corn starch slurry of pH 4.0 (the normal pH of the process slurry) containing 198 g. of corn starch. The slurry was agitated for 18 hours at 48–50° C. The starch product was filtered and dried. The product when cooked in a Corn Industries Viscometer at 5% solids gave a viscosity of 225 g.-cm. The 30 minute viscosity value was 223 g.-cm.

*Example 4*

Example 3 was repeated except that the pH of the slurry was adjusted to 6.5 with alkali prior to the addition of the diepoxide. The resulting product when cooked at 5% solids in a Corn Industries Viscometer gave a maximum viscosity of 160 g.-cm. compared to a viscosity of 150 g.-cm. given by a corresponding cook of unmodified starch.

*Example 5*

In this example 206 g. of starch contained in a 44.5% by weight unmodified corn starch slurry was vigorously agitated and 37.5 ml. of a 2% aqueous sodium hydroxide solution was added to adjust the pH to 10.5. 7.5 g. of limonene dioxide was added and the suspension agitated for 24 hours at 48–50° C. The slurry was then adjusted with dilute hydrochloric acid to pH 5.5 before filtering (a procedure common to starch plant processes). The starch product was filtered, washed and dried. The product when cooked at 5% solids in a Corn Industries Viscometer gave a maximum viscosity of 240 g.-cm. and a 30 minute viscosity of 215 g.-cm.

*Example 6*

2.1 g. of limonene dioxide was added to a 47.2% by weight unmodified corn starch slurry of pH 4.1 containing 201 g. of starch. The slurry was agitated for 18 hours at 43° C. The product was filtered and dried. The product gave a maximum viscosity of 190 g.-cm. when cooked at 5% solids in a Corn Industries Viscometer, and a 30 minute viscosity of 180 g.-cm.

*Example 7*

Example 6 was repeated except that the temperature of the reaction of the starch slurry with limonene dioxide was maintained at 30° C. The resulting product was more viscous than unreacted starch. The starch product gave a maximum viscosity of 190 g.-cm. at 5% solids in a Corn Industries Viscometer, and after 30 minutes the viscosity was 180 g.-cm.

*Example 8*

20.0 g. of limonene dioxide was added to a 50% by weight unmodified corn starch slurry of pH 4.1 and containing 200 g. of starch. The slurry was agitated at 30° C. for 20 hours. The starch product was then filtered and dried. This starch product did not completely gelatinize at the maximum temperature (95° C.) attained in the Corn Industries Viscometer, and when it was cooked at the boiling point or at elevated temperatures at 5% solids an extremely viscous paste was obtained.

*Example 9*

212 g. of starch contained in a 49.7% by weight unmodified corn starch slurry was vigorously agitated and 46.5 ml. of 2% aqueous sodium hydroxide solution added to adjust the pH to 10.5. Then 6.5 g. of dicyclopentadiene dioxide was added and the suspension agitated at 48–50° C. for 18 hours. The slurry was then adjusted with dilute hydrochloric acid to pH 5.5. The starch product was filtered, washed and dried. The product when cooked at 5% solids in the Corn Industries Viscometer gave a viscosity of 200 g.-cm.

The examples show that an amount of diepoxide from as little as about 0.01 mole per mole of anhydro glucose unit in the starch, causes an appreciable increase in the viscosity of the final starch product.

At the higher diepoxide levels, the starch derivatives have a higher gelatinization temperature than unmodified corn starch. Any diepoxide will work in this reaction, but the diepoxide must be present in a form that will react with the starch granules. In other words, a water soluble diepoxide will react with the starch in slurry form, but a diepoxide which is not readily soluble in water must first be dissolved in a solvent which is also miscible with water before it can be reacted with the starch slurry. Some diepoxides are more soluble on the alkaline side or on the acid side, and consequently, a reaction using a base or an acid catalyst will cause the reaction to proceed faster or more completely.

The pH of the starch slurry may vary within a range of about 3.0 to about 11.0. The viscosity of the final starch product is about the same at either end of said range of permissible pH values but falls rather abruptly when the pH is adjusted to a value of about 6.5 or near the neutral point. This is believed to be due to the fact that the reaction can be catalyzed by either hydrogen or hydroxyl ions.

The time of reaction may be varied from 7 to 24 hours with no appreciable effect upon the viscosity of the final product.

The temperature of the reaction may vary from about 65° F. to about 130° F. with no effect upon the final product. If the temperature is much above 130° F. there is danger of gelatinizing the starch, which would prevent filtration and drying in the usual manner. The reaction proceeds more slowly as the temperature is lowered but otherwise there is no temperature limitation upon the reaction. A temperature of about 120° F. is preferred.

The hereinbefore described reaction is not limited to unmodified corn starch, but applies to other amylaceous materials such as modified starches, wheat starch, rice starch, potatos starch, etc.

This invention is intended to cover all changes and modifications of the examples of the invention herein chosen for purposes of the disclosure, which do not constitute departures from the spirit and scope of the invention.

What is claimed is:

1. A process for preparing unswollen cross-linked starch ethers in granule form including the steps of providing a starch slurry in granule form, adding thereto from about 0.01 to about 0.15 mole of diepoxide per mole of anhydroglucose unit of the starch, said starch and diepoxide being reacted at a temperature of from about 65° F. to about 130° F. for a period of time sufficient to cross-link said diepoxide and starch, dewatering and drying said cross-linked product to recover a dried, ungelatinized starch product in granule form.

2. A process for preparing unswollen cross-linked starch ethers in granule form including the steps of providing a starch slurry in granule form, adding thereto from about 0.01 to about 0.15 mole of limonene dioxide per mole of anhydro glucose unit of the starch, said starch and limonene dioxide being reacted at a temperature of from about 65° F. to about 130° F. for a period of time sufficient to cross-link said diepoxide and starch, dewatering and drying said cross-linked product to recover a dried, ungelatinized starch product in granule form.

3. A process for preparing unswollen cross-linked starch ethers in granule form including the steps of providing a starch slurry in granule form, adding thereto from about 0.01 to about 0.15 mole of dicyclopentadiene dioxide per mole of anhydroglucose unit of the starch, said starch and dicyclopentadiene dioxide being reacted at a temperature of from about 65° F to about 130° F. for a period of time sufficient to cross-link said diepoxide and starch, dewatering and drying said cross-linked product to recover a dried, ungelatinized starch product in granule form.

4. A process for preparing unswollen cross-linked starch ethers in granule form including the steps of providing a starch slurry in granule form, adding thereto from about 0.01 to about 0.15 mole of a diepoxide selected from the group consisting of limonene dioxide and dicyclopentadiene dioxide per mole of anhydro glucose unit of starch, and maintaining the starch and diepoxide at a temperature of from about 65° F. to about 130° F. for a period of time sufficient to cross-link said starch and diepoxide.

References Cited in the file of this patent

UNITED STATES PATENTS

| | | |
|---|---|---|
| 2,541,773 | Lolkema et al. | Feb. 13, 1951 |
| 2,626,257 | Caldwell et al. | Jan. 20, 1953 |
| 2,733,238 | Kerr et al. | Jan. 31, 1956 |
| 2,801,241 | Hobbs | July 30, 1957 |